United States Patent
Hac et al.

(10) Patent No.: US 6,789,002 B1
(45) Date of Patent: Sep. 7, 2004

(54) DETERMINATION OF VEHICLE PAYLOAD CONDITION

(75) Inventors: Aleksander B. Hac, Dayton, OH (US); John D. Martens, New Hudson, OH (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/440,604

(22) Filed: May 19, 2003

(51) Int. Cl.⁷ .................................................. G06F 15/00
(52) U.S. Cl. ............................ 701/1; 701/70; 701/124; 340/440
(58) Field of Search ........................... 701/1, 70, 124, 701/36, 37; 340/429, 440; 280/5.502, 5.506, 5.507

(56) References Cited

U.S. PATENT DOCUMENTS

| | | | | |
|---|---|---|---|---|
| 4,712,807 A | * | 12/1987 | Kurosawa | 280/5.508 |
| 5,046,008 A | * | 9/1991 | Dieter | 701/38 |
| 6,304,805 B1 | * | 10/2001 | Onogi | 701/36 |
| 6,338,012 B2 | * | 1/2002 | Brown et al. | 701/1 |
| 6,419,058 B1 | | 7/2002 | Oliver et al. | |
| 6,438,464 B1 | * | 8/2002 | Woywod et al. | 701/1 |
| 6,450,304 B1 | | 9/2002 | Miller et al. | |
| 6,505,108 B2 | | 1/2003 | Bodie et al. | |
| 6,517,089 B2 | | 2/2003 | Phillis et al. | |
| 6,631,317 B2 | * | 10/2003 | Lu et al. | 701/45 |
| 6,697,726 B2 | * | 2/2004 | Takagi et al. | 701/70 |
| 2003/0055549 A1 | * | 3/2003 | Barta et al. | 701/70 |
| 2003/0065430 A1 | * | 4/2003 | Lu et al. | 701/45 |

* cited by examiner

Primary Examiner—Gary Chin
(74) Attorney, Agent, or Firm—Michael D. Smith

(57) ABSTRACT

The invention provides a method, a computer usable medium including a program, and a system for determining a vehicle payload condition. The method and computer usable medium include the steps of determining a first payload-state parameter, a second payload-state parameter, and at least one roll value. A first differential is determined based on the first payload-state parameter and the second payload-state parameter. A second differential is determined based on the first payload-state parameter and the roll value. A multiplier is determined. A payload estimate is determined based on the first payload differential, the second payload differential, and the multiplier. The system includes means for achieving the method steps of the invention.

26 Claims, 5 Drawing Sheets

DETERMINATION OF VEHICLE PAYLOAD CONDITION

TECHNICAL FIELD OF THE INVENTION

The present invention relates generally to motor vehicles. More particularly, the invention relates to a strategy for determining a vehicle payload condition.

BACKGROUND OF THE INVENTION

Vehicle dynamic behavior may be significantly affected by vehicle loading condition. One known method of estimating vehicle payload is based on pressure measurements in the air springs of self-leveling suspensions. Few vehicles, however, are equipped with self-leveling suspensions and even fewer feature pressure sensors. On the other hand, active safety systems, which require sensors measuring vehicle dynamic response, are becoming more common. For example, many modern vehicles are equipped with vehicle stability enhancement (VSE) systems, which include lateral acceleration sensors. Anti-rollover systems use roll rate sensors in order to evaluate rollover danger and either to apply brakes (in order to reduce probability of rollover) or to deploy passive safety restraints if rollover is deemed imminent. Vehicles with electronically controlled suspensions (e.g. semi-active suspensions) often utilize suspension deflection sensors, which measure relative position of wheels with respect to the body.

Vehicle dynamic response to driver steering and braking inputs, in particular roll, pitch and yaw responses, may be significantly affected by vehicle payload. Therefore, several chassis control systems may significantly benefit from information regarding vehicle payload. For example, brake force distribution may be made dependent on payload conditions, thus improving braking efficiency and reducing stopping distance under a variety of loading conditions.

Active chassis systems, which control vehicle response in the yaw plane, such as VSE and active rear steer systems, typically utilize a vehicle reference model, which generates desired vehicle response. These systems may benefit by adapting the reference model to payload conditions in order to improve performance and/or reduce unnecessary activations. Electronically controlled suspensions generally require estimation of body motions, which may be improved if knowledge of payload conditions were available; this in turn may bring about performance improvements. It would therefore be beneficial to provide a strategy for determining vehicle payload condition using sensor information that becomes more widely available in modern vehicles.

Accordingly, it would be desirable to provide a strategy for determining vehicle payload condition that overcomes the aforementioned and other disadvantages.

SUMMARY OF THE INVENTION

A first aspect of the present invention provides a method of determining a vehicle payload condition. The method includes determining a first payload-state parameter, a second payload-state parameter, and at least one roll value. A first differential is determined based on the first payload-state parameter and the second payload-state parameter. A second differential is determined based on the first payload-state parameter and the roll value. A multiplier is determined. A payload estimate is determined based on the first payload differential, the second payload differential, and the multiplier.

A second aspect of the invention provides a computer usable medium including a program for determining a vehicle payload condition. The computer usable medium includes computer readable program code for determining a first payload-state parameter, a second payload-state parameter, and at least one roll value. The computer usable medium further includes computer readable program code for determining a first differential based on the first payload-state parameter and the second payload-state parameter, determining a second differential based on the first payload-state parameter and the roll value, determining a multiplier, and determining a payload estimate based on the first payload differential, the second payload differential, and the multiplier.

A third aspect of the invention provides a system for determining a vehicle payload condition. The system includes means for determining at least one roll value, means for determining a first payload-state parameter and a second payload-state parameter, means for determining a first differential based on the first payload-state parameter and the second payload-state parameter, and means for determining a second differential based on the first payload-state parameter and the roll value. The system further includes means for determining a multiplier and means for determining a payload estimate based on the first payload differential, the second payload differential, and the multiplier.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DESCRIPTION OF THE PRESENTLY PREFERRED EMBODIMENTS

Figure 1:
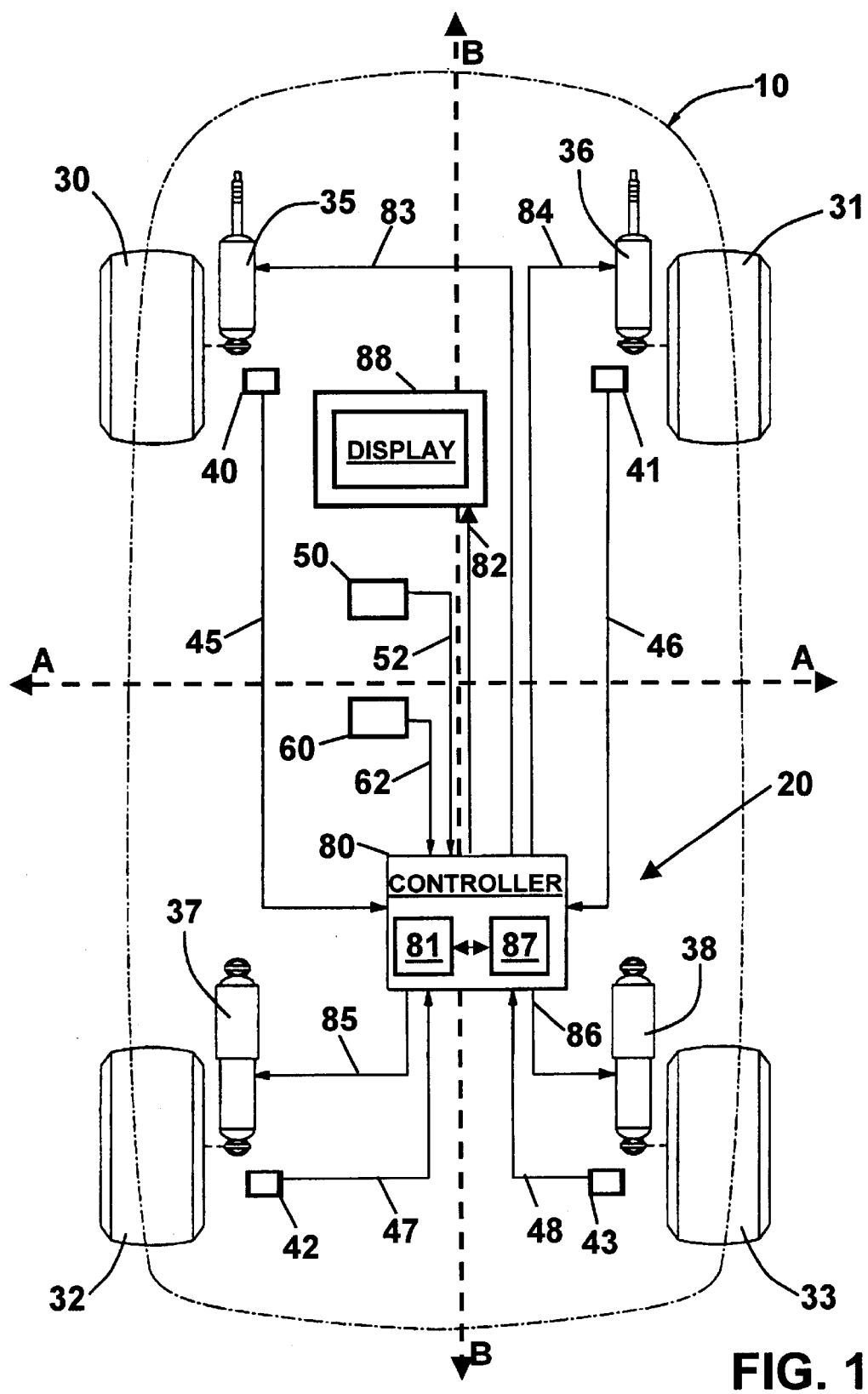
FIG. 1 is a schematic view of a vehicle with a vehicle payload condition system in accordance with the present invention.

Referring to the drawings, wherein like reference numerals refer to like elements, FIG. 1 is a schematic view of a vehicle, shown generally by numeral 10, with a vehicle payload condition system 20 in accordance with the present invention. Those skilled in the art will recognize that the vehicle 10 and vehicle payload condition system 20 may include a number of alternative designs and may be employed in a variety of applications. For example, as will be described, the vehicle 10 may include various sensor(s) as part of different embodiments of the vehicle payload condition system 20. In the present description and figures, the vehicle 10 and vehicle payload condition system 20 include four linear acting fluid magnetorheological (MR) dampers for generating dampening forces in a motor vehicle suspension system.

Vehicle 10 may be supported on a plurality, in this case four, wheels 30, 31, 32, 33 and each may include a corresponding suspension with springs (not shown) of a known type. Each suspension may include a variable-force, real time, controllable MR damper 35, 36, 37, 38 connected to dampen vertical forces between the wheel 30, 31, 32, 33 and vehicle 10 body at that suspension point. Although many such suspension arrangements are known and may be adapted for use with the present invention, the dampers 35, 36, 37, 38 may be electrically controllable, variable dampening force shock absorbers with a weight bearing coil spring in a parallel spring/shock absorber or McPherson strut arrangement.

An exemplary MR damper that may be adapted for use with the present invention is described in U.S. Pat. No. 6,419,058 to Oliver et al. Such a damper may receive a signal for generating variable dampening forces by, for example, applying current to a coil assembly associated with a damper piston. The coil generates a magnetic field inducing localized flow characteristic changes in MR fluid thereby increasing dampening force.

In a first embodiment of the present invention, each damper 35, 36, 37, 38 may include a relative position sensor 40, 41, 42, 43 that provides an output signal, represented by lines 45, 46, 47, 48, indicative of the relative vertical distance between the corresponding wheel 30, 31, 32, 33 and a suspended vehicle body at that corner of the vehicle 10. Position sensors 40, 41, 42, 43 may include a resistive device mounted to the vehicle 10 body and a link pivotally coupled between the wheel 30, 31, 32, 33 and a pivot arm on the resistive device. The resistive device may provide an impedance output that varies with the relative vertical position between wheel 30, 31, 32, 33 and the corner of body 10. Each position sensor 40, 41, 42, 43 may further include an internal circuit board with a buffer circuit for buffering the output signal of the resistive device and providing the buffered signal to a controller 80, where a vehicle 10 roll angle may be determined. Suitable position-type sensors are known to, or can be constructed by, those skilled in the art.

Vehicle 10 may also include one or more, in this case one, lateral acceleration sensor 50 for providing an output signal, represented by line 52, indicative of acceleration roughly along axis A. Lateral acceleration sensor 50 may provide its output signal 52 to a controller 80. Suitable lateral acceleration-type sensors are known to, or can be constructed by, those skilled in the art.

In a second embodiment of the present invention, the vehicle 10 may additionally include one or more, in this case one, roll rate sensor 60 instead of or in addition to the position sensors 40, 41, 42, 43. Roll rate sensor 60 may provide an output signal, represented by line 62, indicative of the rate of roll roughly about axis B. Lateral acceleration sensor 50 may provide its output signal 52 to the controller 80. Suitable roll rate-type sensors are known to, or can be constructed by, those skilled in the art. Those skilled in the art will recognize that numerous alternative types of position, velocity, roll rate, acceleration, and other sensors, including transformer-type sensors, may be adapted for use with the present invention.

In the first, second, or another embodiment of the invention, the controller 80 may include a digital microprocessor 81 programmed to process a plurality of input signals in a stored algorithm and generate one or more output signals, indicated by lines 82, 83, 84, 85, 86, for indicating the vehicle payload condition and modulating the dampening force of the dampers 35, 36, 37, 38. The methods, algorithms, and determinations (e.g., calculations and estimations), of the presently preferred embodiments, including those based on equations or value tables, may be performed by a device such as the microprocessor 81. The computer usable medium and value tables associated with the presently preferred embodiments may be programmed or read into a memory portion 87 (e.g., ROM, RAM, and the like) thereby allowing the microprocessor 81 to execute a vehicle payload condition algorithm in accordance-with the present invention. Furthermore, the values, parameters, and other numerical data may be stored as required in the memory portion 87. Analog signal processing may be provided for some of the input signals. For example, the signals from relative position sensors 40, 41, 42, 43, lateral acceleration sensor 50, and/or roll rate sensor 60 may be low-pass filtered through analog low-pass filter(s) to reduce signal noise. A display 88, such as a digital or analog display, may receive an output signal 82 from the controller 80 indicating the determined vehicle payload condition.

Figure 2:
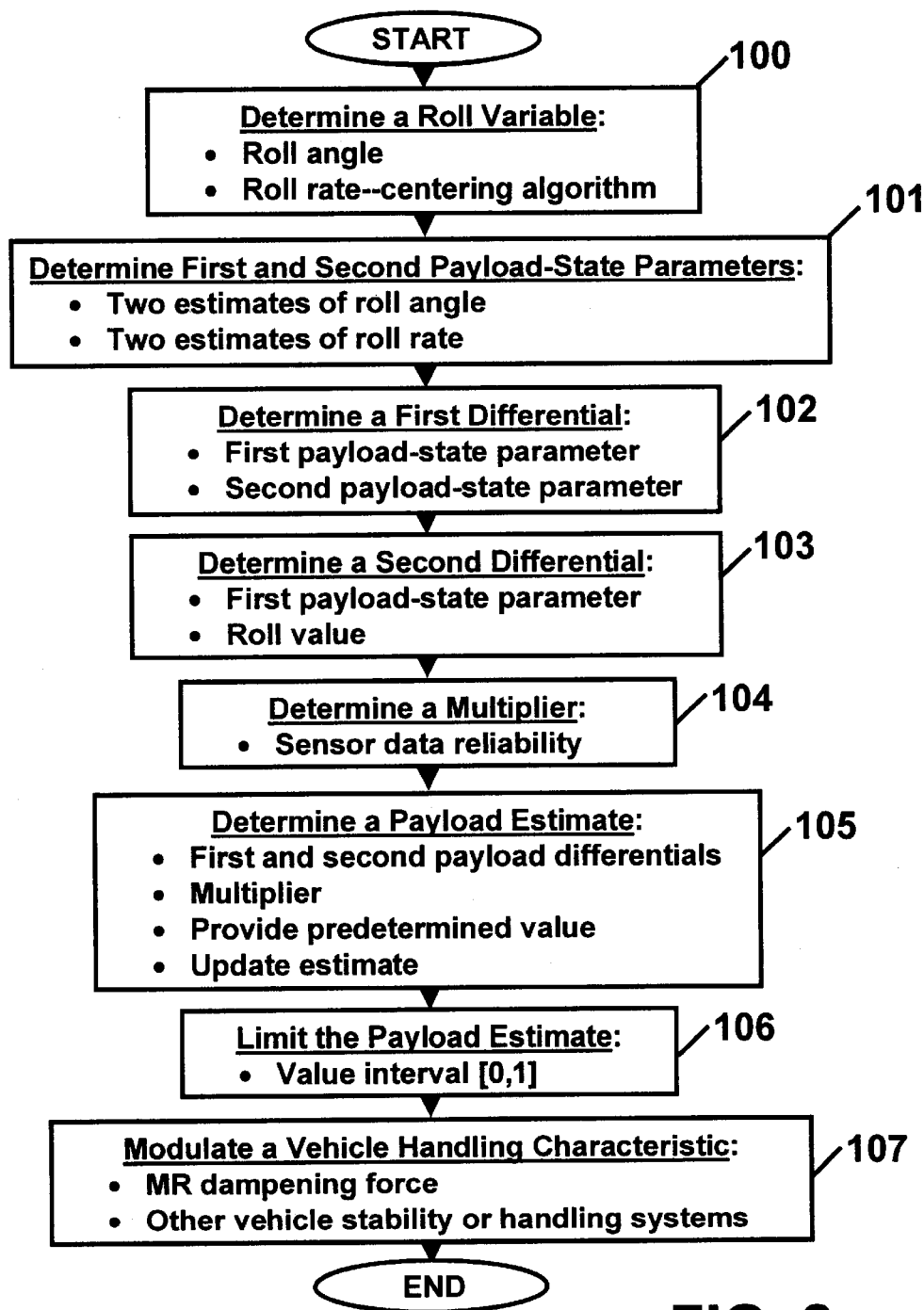
FIG. 2 is a flow chart of a vehicle payload condition algorithm made in accordance with the present invention.

FIG. 2 is a flow diagram of a vehicle payload condition algorithm for use in the vehicle payload condition system of FIG. 1. The vehicle payload condition algorithm provides a strategy for determining vehicle payload condition using relative position sensor, lateral acceleration sensor, and/or roll rate sensor information, which may commonly be found in controllable suspensions, VSE systems, and anti-rollover systems. The algorithm may be implemented with at least two different sensor sets, which were previously described for the first and second embodiments: A) the first embodiment including lateral acceleration and relative position sensors, and B) the second embodiment including lateral acceleration and roll rate sensors.

In two presently preferred embodiments, the vehicle payload condition algorithm may be employed to determine vehicle payload condition using information from lateral acceleration sensor and either roll rate sensor or suspension relative position sensors and known vehicle parameters. The algorithm partially relies on a principle that during cornering maneuvers a vehicle with a full payload (e.g., "loaded") rolls more than with a minimal payload (e.g., "unloaded"). Specifically, both vehicle roll angle and roll rate are larger for the loaded vehicle. Therefore, vehicle payload condition may be determined by continuously comparing the roll angle or roll rate calculated from one set of sensors with roll angle or roll rate estimated from lateral acceleration using two models, for example, one corresponding to an unloaded vehicle, the other to a loaded vehicle.

Figure 3:
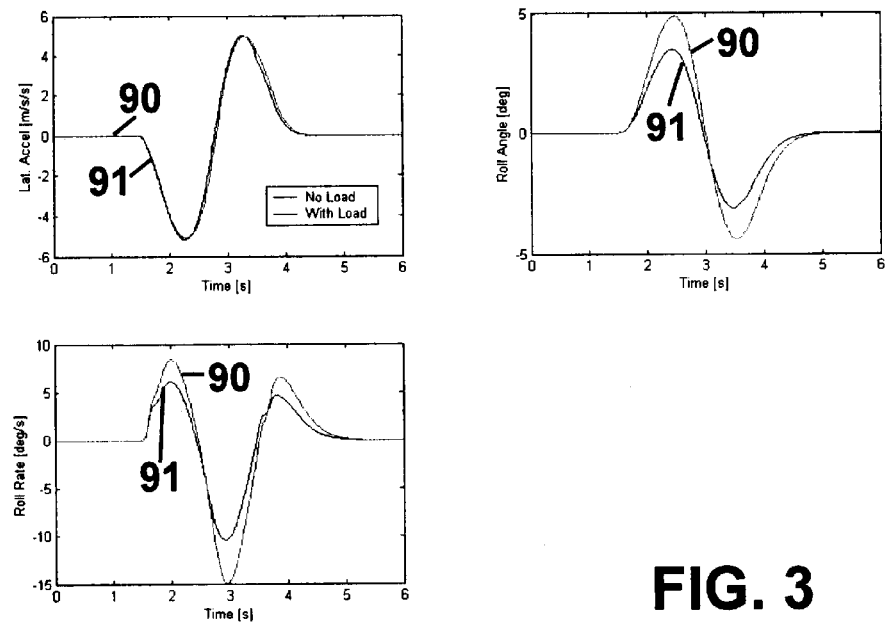
FIG. 3 illustrates simulated vehicle roll response from a test vehicle in loaded and unloaded states during a lane change maneuver.
Figure 4:
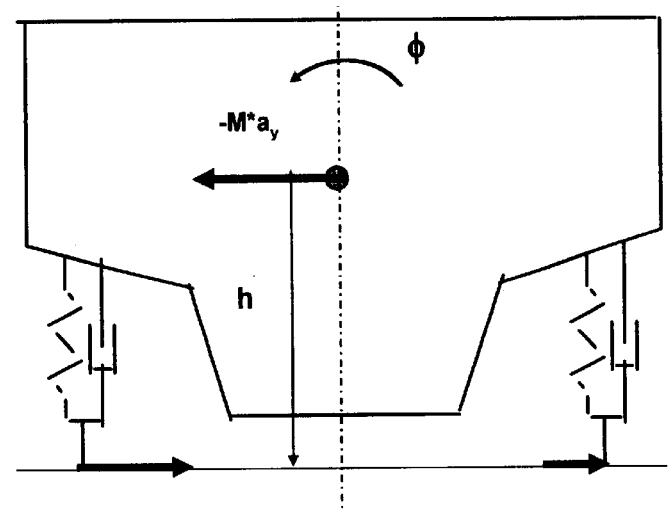
FIG. 4 illustrates a model of vehicle roll mode.

FIG. 3 illustrates simulated vehicle roll response from a test vehicle in loaded 90 and unloaded 91 states during a lane change maneuver. In both cases, lateral acceleration is almost identical, but the loaded vehicle experiences significantly larger roll angles and roll rates throughout the maneuver. This behavior may easily be explained by a model, representing a vehicle roll mode, illustrated in FIG. 4. This model may be described by the following 2-nd order differential equation:

$$I_{xx}*d^2\phi/dt^2 + c*d\phi/dt + k*\phi = -M*h*a_{ym} \qquad (1)$$

wherein $I_{xx}$ is a moment of inertia of vehicle body about the roll axis, c is roll damping of suspension, k is roll stiffness of suspension and tires, M denotes vehicle mass, h is the height of vehicle center of gravity above ground, φ is the body roll angle and $a_{ym}$ is measured lateral acceleration (including the component of gravity, g*sinφ). In a steady-state condition, the roll angle may be given by:

$$\phi_{ss}=-(M*h/k)*a_{ym}=G_{roll}*a_{ym} \quad (2)$$

wherein $G_{roll}=-M*h/k$ is a roll gain (the ratio of roll angle to lateral acceleration in steady-state cornering). The value may increase along with payload because mass M increases proportionally with payload. The height, h, may also increase slightly while the suspension roll stiffness remains constant. In some cases, the suspension roll stiffness may increase slightly due to progressive stiffness characteristics of suspension springs, but generally not enough to offset changes in vehicle mass, M, and height, h. Thus, a vehicle with a full payload experiences higher roll angles than without.

Figure 5:
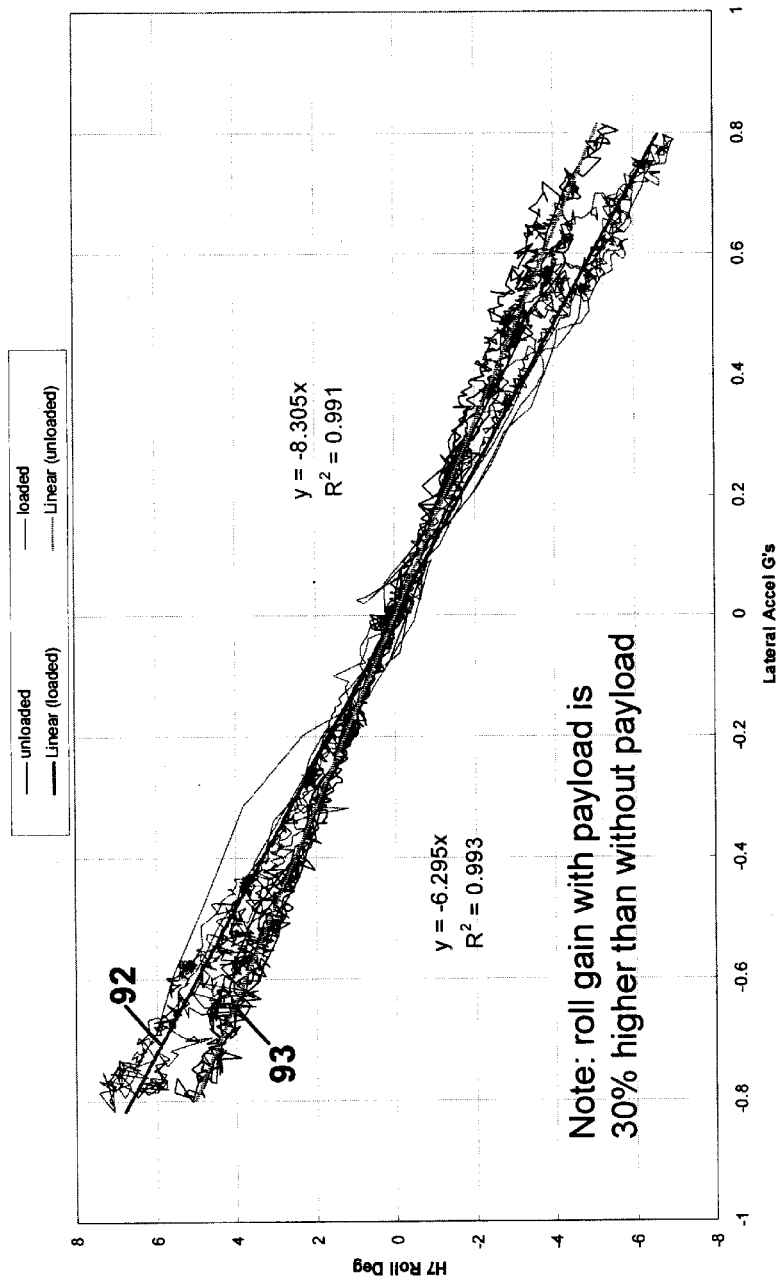
FIG. 5 illustrates a relationship between roll angle and lateral acceleration obtained from a test vehicle in unloaded and loaded states.

FIG. 5 illustrates a relationship between roll angle and lateral acceleration obtained from a test vehicle in unloaded and loaded states. Straight lines fitted to both sets of test data reveal that the roll gain for the loaded vehicle 92 may be about 30% higher than for the unloaded vehicle 93.

Using standard notation for a second order system, equation (1) may be written as:

$$d^2\phi/dt^2+2*\zeta*\omega_n*d\phi/dt+\omega_n^2*\phi=G_{roll}*\omega_n^2*a_{ym} \quad (3)$$

wherein $\omega_n=(k/I_{xx})^{1/2} c/[2*(k*I_{xx})^{1/2}]$ is a damping ratio. The relationship between the lateral acceleration and the resulting roll angle or roll rate may be represented as Laplace domain transfer functions:

$$\phi=G_{roll}*[\omega_n^2/(s^2+2*\zeta*\omega_n*s+\omega_n^2)]*a_{ym} \quad (4a)$$

$$\omega=G_{roll}*[\omega_n^2*s/(s^2+2*\zeta*\omega_n*s+\omega_n^2)]*a_{ym} \quad (4a)$$

wherein $\omega=d\phi/dt$ is a roll rate. Addition of vehicle payload increases vehicle mass, M, moment of inertia, $I_{xx}$, and usually also height, h, of vehicle center of gravity. Thus, the roll gain, $G_{roll}$, increases with payload, as explained above, while both natural frequency and damping ratio decrease with payload. Consequently, both roll angle and roll rate increase with payload.

The roll angle or roll rate may be determined by passing the measured lateral acceleration through two filters representing roll dynamics for unloaded and fully loaded vehicle. As roll angle and roll rate may also be derived from suspension relative position sensors and roll rate sensor, respectively, the payload conditions may be derived by continuously comparing the latter values with those obtained from lateral acceleration.

Consider, for the purpose of illustration, the embodiment where suspension relative position sensors are available. From these sensors, a "measured" roll angle, $\phi_m$, may be obtained. Two estimates of roll angle may also be calculated as follows:

$$\phi_{e1}=G_{roll1}*[\omega_{n1}^2/(s^2+2*\zeta_1*\omega_{n1}*s+\omega_{n1}^2)]*a_{ym} \quad (5a)$$

$$\phi_{e2}=G_{roll2}*[\omega_{n2}^2/(s^2+2*\zeta_1*\omega_{n2}*s+\omega_{n2}^2)]*a_{ym} \quad (5a)$$

where subscript 1 may represent parameters of an unloaded vehicle and subscript 2 of a fully loaded vehicle. The final estimate of roll angle may be a weighted sum of both estimates and typically match the "measured" yaw rate as closely as possible. Therefore:

$$\phi_m=(1-w)*\phi_{e1}+w*\phi_{e2} \quad (7a)$$

wherein parameter, w, is a weighting factor, which indicates loading condition. It may vary from 0 for the unloaded vehicle to 1 for the fully loaded vehicle. As this parameter appears linearly in equation (7a), it may be estimated using a recursive least square parameter estimation algorithm, as known in the art. At any time instant, i, equation (7a) may be written as:

$$\Delta\phi_1(i)*w=\Delta\phi_2(i) \quad (8a)$$

where:

$$\Delta\phi_1(i)=\phi_{e1}(i)-\phi_{e2}(i), \Delta\phi_2(i)=\phi_{e1}(i)-\phi_m(i) \quad (9a)$$

Then, the recursive least-square estimate of parameter, w, may be obtained as follows:

$$w(i)=w(i-1)+\gamma(i)*P(i)*\Delta\phi_1(i)*\Delta\phi_1(i) \quad (11a)$$

with the initial condition w(1)=0. Variable, P(i), may be computed as follows:

$$P(i)=P(i-1)/[1+P(i-1)*\Delta\phi_1(i)*\Delta\phi_1(i)] \quad (11a)$$

with the initial condition $P(1)=1/[\epsilon+\Delta\phi_1(1)*\Delta\phi_1(1)]$, where $\epsilon$ is a small positive number. The multiplier, $\gamma(i)$, determines the speed of parameter adaptation. This parameter may be equal to zero when sensor data is "unreliable" and is therefore discarded (i.e., parameter, w, is not updated at this iteration and previous estimate is held). In general, the measurements may be rejected when the measured signals are very small, implying high signal to noise ratio, or when measured and estimated values are inconsistent with each other, indicating that the roll is caused by road disturbances, rather than handling maneuvers.

Essentially the same procedure may be applied to the embodiment when roll rate is measured instead of roll angle. In this case the roll angle, φ, may be replaced by roll rate, ω, in equations (7a) through (11a). The first estimates of roll rate, which is a derivative of roll angle, may be obtained from lateral acceleration and calculated as follows:

$$\omega_{e1}=G_{roll1}*[\omega_{n1}^2*s/(s^2+2*\zeta_1*\omega_{n1}*s+\omega_{n1}^2)]*a_{ym} \quad (5b)$$

$$\omega_{e2}=G_{roll2}*[\omega_{n2}^2*s/(s^2+2*\zeta_1*\omega_{n2}*s+\omega_{n2}^2)]*a_{ym} \quad (6b)$$

Referring again to FIG. 2, the vehicle payload condition algorithm may start by determining a roll variable (step 100). In the first embodiment, the roll variable is a roll angle determined from the vehicle position sensor data. The roll angle may be computed as follows:

$$\phi_m=C*(RP\_LF-RP\_RF+RP\_LR-RP\_RR)/(2*t_w) \quad (12)$$

wherein RP_LF is a relative position of a left front wheel, RP_RF is a relative position of a right front wheel, RP_LR is a relative position of a left rear wheel, RP_RR is a relative position of a right right wheel, $t_w$ is track width, and C denotes a constant, which may be greater than 1. The constant, C, accounts for the fact that body roll computed from suspension deflections (e.g., RPs) may be smaller than actual roll angle, which includes axle roll (due to tire compliance). This constant may be approximated as follows:

$$C=1+\kappa_{susp}/\kappa_{tire} \quad (13)$$

wherein $\kappa_{susp}$ is a total roll stiffness of suspension (including springs and roll bars) and $\kappa_{tire}$ is the roll stiffness due to tire compliance (i.e., $\kappa_{tire}=k_{tire}*t_w^2$, wherein $k_{tire}$ is the tire stiffness in vertical direction). The relative positions, RPs, are assumed to be centered and reduced to wheel locations.

In the second embodiment, the roll variable is a roll rate determined from the vehicle roll rate sensor data. A centering algorithm may be applied to the measured roll rate, as known in the art. The centering algorithm typically removes sensor bias and partially removes the effect of changing a bank angle of the road on the measured roll rate. It may use roll rate and lateral acceleration measurements. As such, a measured and centered roll rate, $\omega_{mc}$, may be obtained.

A first payload-state parameter and a second payload-state parameter are determined (step 101). In the first embodiment, the first and second payload-state parameters may be two estimates of roll angle. The roll angle estimates may be determined from sensed lateral acceleration measurements using filters with two sets of parameters: one set representing an unloaded vehicle condition and one set representing a loaded vehicle condition. In a Laplace domain, the filters may be represented as follows:

$$\phi_{e1}=G_{roll1}*[\omega_{n1}^2/(s^2+2*\zeta_1*\omega_{n1}*s+\omega_{n1}^2)]*a_{ym} \tag{5a}$$

$$\phi_{e2}=G_{roll2}*[\omega_{n2}^2/(s^2+2*\zeta_1*\omega_{n2}*s+\omega_{n2}^2)]*a_{ym} \tag{6a}$$

wherein s represents Laplace operand (time derivative in time domain), $G_{roll}$ is the (steady-state) roll gain, $\omega_n$ on and $\zeta$ represent the undamped natural frequency and the damping ratio of roll mode, and $\phi_e$ is the estimate of roll angle. The subscript 1 refers to vehicle without payload and 2 with full payload. Those skilled in the art will appreciate that the conditions that constitute an unloaded and a loaded vehicle may vary by vehicle and application type. The first and second payload-state parameters need not represent "fully" unloaded and "fully" loaded conditions, respectively.

In the second embodiment, the first and second payload-state parameters may be two estimates of roll rate. The roll rate estimates may be determined from sensed lateral acceleration measurements using filters with two sets of parameters: one set representing an unloaded vehicle condition and one set representing a loaded vehicle condition. In a Laplace domain, the filters may be represented as follows:

$$\omega_{e1}=G_{roll1}*[s*\omega_{n1}^2/(s^2+2*\zeta_1*\omega_{n1}*s+\omega_{n1}^2)]*a_{ym} \tag{5b}$$

$$\omega_{e2}=G_{roll1}*[s*\omega_{n2}^2/(s^2+2*\zeta_1*\omega_{n2}*s+\omega_{n2}^2)]*a_{ym} \tag{6b}$$

wherein s represents Laplace operand (time derivative in time domain), $G_{roll}$ is the (steady-state) roll gain, $\omega_n$ and $\zeta$ represent the undamped natural frequency and the damping ratio of roll mode, and $\omega_e$ is the estimate of roll rate. The subscript 1 refers to vehicle without payload and 2 with full payload.

A first differential is then determined based on the first payload-state parameter and the second payload-state parameter (step 102). In the first embodiment, the first differential may be determined by subtracting the two roll angle estimates (e.g., the second payload-state parameter from the first payload-state parameter):

$$\Delta\phi_1(i)=\phi_{e1}(i)-\phi_{e2}(i) \tag{9a}$$

In the second embodiment, the first differential may be determined by subtracting the two roll rate estimates (e.g., the second payload-state parameter from the first payload-state parameter):

$$\Delta\omega_1(i)=\omega_{e1}(i)-\omega_{e2}(i) \tag{9b}$$

A second differential is determined based on the first payload-state parameter and the roll value (step 103). In the first embodiment, the second differential may be determined by subtracting the "measured" roll angle $\phi_m$, from the roll angle estimate corresponding to the unloaded vehicle condition (e.g., the first payload-state parameter):

$$\Delta\phi_2(i)=\phi_{e1}(i)-\phi_m(i) \tag{9a}$$

In the second embodiment, the second differential may be determined by subtracting the measured and centered roll rate, $\omega_{mc}$, from the roll rate estimate corresponding to the unloaded vehicle condition (e.g., the first payload-state parameter):

$$\Delta\omega_2(i)=\omega_{e1}(i)-\omega_{mc}(i) \tag{9b}$$

A multiplier is determined (step 104). In the first and second embodiments, the multiplier, $\gamma$, may be used to determine the rate of updating a payload estimate. The multiplier, $\gamma$, may be equal to zero when the sensor data is considered "unreliable". In the present description, the term "unreliable" may refer to the instances wherein the sensor data is small compared to the noise level (i.e., a small signal-to-noise ratio) and/or includes confounding data as would occur, for example, with bumpy roads, extreme handling maneuvers, and the like. When multiplied by the zero value, the estimates based off such flawed data are nullified. As such, when the multiplier equals zero, the payload estimate is not updated and the payload estimate from a previous iteration is retained. Should the data be considered "reliable", the multiplier may equal a value of one and the previous payload estimate may be updated with the current estimate.

In the first embodiment, the multiplier may equal zero when either the magnitude of measured roll angle is below a threshold value (i.e., $|\phi_m|<$Thre1) or when the measured and estimated roll angles are not sufficiently close to each other (i.e. $|\phi_m-\phi_{e1}|>$Thre2*$|\phi_m|$+Thre3). In the first case, the measured roll angle may be small and the signal to noise ratio unacceptably low. In the second case, the measured and estimated variables may not be consistent with each other; this usually happens when roll motion is caused by road inputs, rather then by inertial lateral forces arising during cornering maneuvers.

In the second embodiment, the multiplier may equal zero when either the magnitude of measured roll rate is below a threshold value (i.e. $|\omega_{mc}|<$Thre1) or when the measured and estimated roll rates are not sufficiently close to each other (i.e. $|\omega_{mc}-\omega_{e1}|>$Thre2*$|\omega_{mc}|$+Thr3). In the first case, the measured roll rate may be small and the signal to noise ratio unacceptably low. In the second case, the measured and estimated variables may not be consistent with each other; this usually happens when roll motion is caused by road inputs, rather then by inertial lateral forces arising during cornering maneuvers.

A payload estimate is determined based on the first payload differential, the second payload differential, and the multiplier (step 105). In the first and second embodiments, a predetermined value may be provided as an initial payload estimate. For example, the initial payload estimate, w(1), may preferably equal zero, corresponding to the unloaded vehicle condition. Alternatively, the predetermined value may be a previously determined estimate retrieved from the controller memory portion. Once the initial value is provided, the payload estimate, w, may be updated using a recursive least square estimation algorithm.

In the first embodiment, a variable, P, is first determined by the equation:

$$P(i)=P(i-1)/[1+P(i-1)*\Delta\phi_1(i)] \tag{11a}$$

wherein the initial condition $P(1)=1/[\epsilon+\Delta\phi_1(1)*\Delta\phi_1(1)]$. The value, i, refers to a sample number, and $\epsilon$ is a small positive number introduced to avoid division by 0. A new payload estimate, w, may then be determined as follows:

$$w(i)=w(i-1)+\gamma(i)*P(i)*\Delta\phi_1(i)*[\Delta\phi_2(i)-\Delta\phi_1(i)*w(i-1)] \quad (10a)$$

with the initial condition w(1)=0.

In the second embodiment, a variable, P, is first determined by the equation:

$$P(i)=P(i-1)/[1+P(i-1)*\Delta\omega_1(i)*\Delta\omega_1(i)] \quad (11b)$$

wherein the initial condition $P(1)=1/[\epsilon+\Delta\omega_1(1)*\Delta\omega_1(1)]$. The value, i, refers to a sample number, and $\epsilon$ is a small positive number introduced to avoid division by 0. A new payload estimate, w, may then be determined as follows:

$$w(i)=w(i-1)+\gamma(i)*P(i)*\Delta\omega_1(i)*[\Delta\omega_2(i)-\Delta\omega_1(i)*w(i-1)] \quad (10b)$$

with the initial condition w(1)=0.

Once the payload estimate is determined, it may be limited to a value interval (step 106). In the first and second embodiments, the payload estimate may be preferably limited to a value interval [0,1], wherein the value, 0, corresponds to the unloaded condition and the value, 1, corresponds to the fully loaded condition. Those skilled in the art will recognize that the value interval may vary. The limited payload estimate may optionally be multiplied by a constant to determine a vehicle payload weight and added to another constant representing the unloaded vehicle weight to determine the gross weight of the vehicle.

Once determined, the vehicle payload condition may be used to modulate a vehicle handling characteristic (step 107). The vehicle handling characteristic may be one or more factors relating to the control, stability, and/or handling characteristics of the vehicle, including those managed by controllable suspension systems (e.g., dampening force), steering systems (e.g., active front and/or rear steering), braking systems, acceleration systems, vehicle stability enhancement (VSE) systems, anti-rollover systems (ARS), and the like. In one embodiment, the dampening force of the MR damper(s) may be modulated as known in the art to compensate for varying vehicle payload conditions. For example, the dampening force(s) may be increased as the vehicle payload increases and vice-versa. One or more look-up value table(s), equation(s), and the like may be provided to allow the determination of an appropriate dampening force for a given vehicle payload condition. In another embodiment, the estimated vehicle payload condition may be used to modify or enhance the behavior of other vehicle stability or handling systems. Those skilled in the art will recognize that the estimate of vehicle payload condition may be used for numerous applications and is not limited to the presently described embodiment of the controllable suspension system dampening force. For example, the determined vehicle payload condition may be used to improve the performance of active front and rear steer systems, brake systems (e.g., stopping distance, anti-lock braking, lateral stability, etc.), VSE systems, ARS, and the like. The control of these systems based on vehicle payload condition is known in the art.

Figure 6:
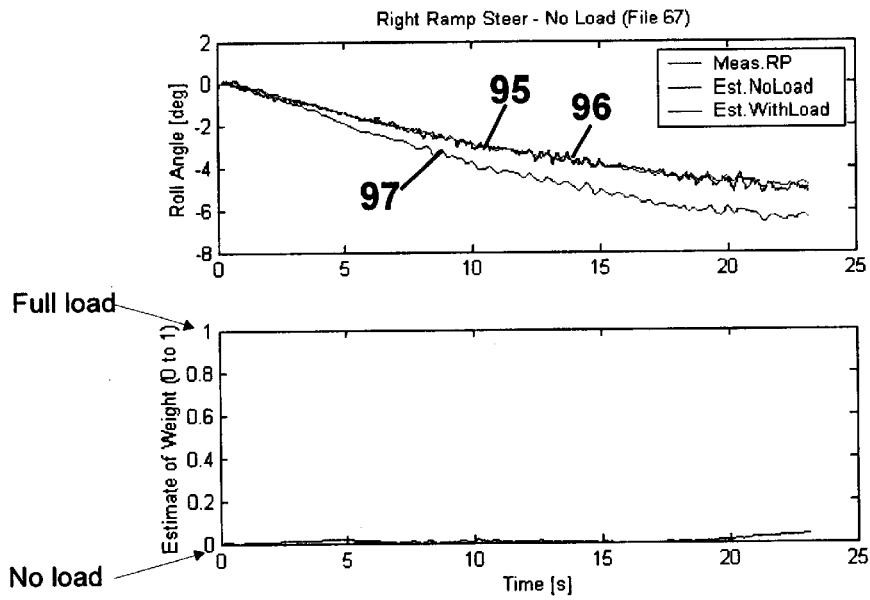
FIG. 6 illustrates exemplary results of vehicle payload estimation from a test vehicle in an unloaded state during ramp steer input.
Figure 7:
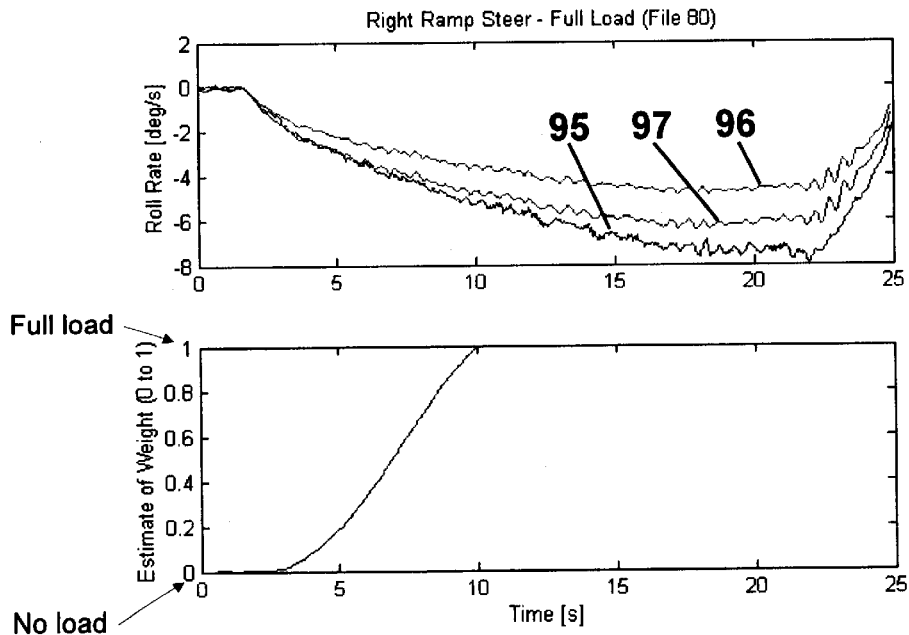
FIG. 7 illustrates exemplary results of vehicle payload estimation from a test vehicle in a loaded state during ramp steer input.

Exemplary results of vehicle payload estimation from a test vehicle are shown in FIG. 6 for the vehicle in an unloaded state and in FIG. 7 for the vehicle in a loaded state. In the unloaded state, the measured roll angle 95 approximates the estimate obtained from the model without payload ($\phi_{e1}$) 96, but not the estimate obtained from the model with payload ($\phi_{e2}$) 97. In the loaded state, the opposite is true. In both cases, the estimation algorithm correctly recognizes the vehicle payload condition.

The algorithm described herein may be applied with other sensor sets, given they provide two independent indications of vehicle roll angle or roll rate. The first indication may constitute more or less a direct measurement, while the second indication is generally dependent on inertial forces. For example, instead of the direct lateral acceleration measurement, a combination of vehicle yaw rate and speed or a combination of vehicle steering angle and speed may be used.

A similar strategy may be applied to the estimation of vehicle payload condition, wherein information about vehicle longitudinal (acceleration) and pitch (e.g., pitch angle or pitch rate) motions is utilized instead of the information about lateral (acceleration) and roll motions (e.g., roll angle or roll rate). This strategy is valid because vehicles with larger payload typically experience larger pitch motions in response to longitudinal acceleration resulting from accelerating or braking. In this case, the sensor set may consist of either longitudinal acceleration and pitch rate sensors or longitudinal acceleration and suspension relative position sensors. Longitudinal acceleration measurements may be replaced by an estimate obtained, for example, from measured wheel speeds or brake and throttle inputs.

While the embodiments of the invention disclosed herein are presently considered to be preferred, various changes and modifications can be made without departing from the spirit and scope of the invention. For example, the vehicle and payload condition system and algorithm are not limited to any particular design, configuration, sequence, arrangement, equation, or strategy. The dampers, sensors, and controller configuration, size, shape, geometry, location, orientation, number, and function may vary without limiting the utility of the invention. Furthermore, the algorithm may be accomplished by numerous alternative strategies, may include additional steps, vary in step order, and may be utilized in a variety of applications.

Upon reading the specification and reviewing the drawings hereof, it will become immediately obvious to those skilled in the art that myriad other embodiments of the present invention are possible, and that such embodiments are contemplated and fall within the scope of the presently claimed invention. The scope of the invention is indicated in the appended claims, and all changes that come within the meaning and range of equivalents are intended to be embraced therein.

What is claimed is:

1. A method of determining a vehicle payload condition, the method comprising;
   determining a first payload-state parameter, a second payload-state parameter, and at least one roll variable;
   determining a first differential based on the first payload-state parameter and the second payload-state parameter;
   determining a second differential based on the first payload-state parameter and the roll value;
   determining a multiplier;
   determining a payload estimate based on the first payload differential, the second payload differential, and the multiplier.

2. The method of claim 1 wherein the step of determining the first and second payload-state parameters comprises sensing a lateral acceleration of the vehicle.

3. The method of claim 2 wherein the step of sensing the lateral acceleration of the vehicle comprises sensing a longitudinal acceleration of the vehicle.

4. The method of claim 1 wherein the step of determining the first and second payload-state parameters comprises estimating at least one of a vehicle steering angle, a vehicle yaw rate, and a vehicle speed.

5. The method of claim 1 wherein the first payload-state parameter comprises an unloaded vehicle condition.

6. The method of claim 1 wherein the second payload-state parameter comprises a loaded vehicle condition.

7. The method of claim 1 wherein the roll value comprises at least one parameter selected from a group consisting of a roll angle, a roll rate, a pitch angle, and a pitch rate.

8. The method of claim 1 wherein the step of determining the multiplier comprises determining at least one reliability factor.

9. The method of claim 1 wherein the step of determining the payload estimate comprises:

providing a predetermined value of the payload estimate; and updating the predetermined value of the payload estimate.

10. The method of claim 1 further comprising centering the roll value.

11. The method of claim 1 further comprising limiting the payload estimate to a value interval.

12. The method of claim 1 further comprising modulating a vehicle handling characteristic based on the payload estimate.

13. A computer usable medium including a program for determining a vehicle payload condition, the computer usable medium comprising;

computer readable program code for determining a first payload-state parameter, a second payload-state parameter, and at least one roll value;

computer readable program code for determining a first differential based on the first payload-state parameter and the second payload-state parameter;

computer readable program code for determining a second differential based on the first payload-state parameter and the roll value;

computer readable program code for determining a multiplier;

computer readable program code for determining a payload estimate based on the first payload differential, the second payload differential, and the multiplier.

14. The computer usable medium of claim 13 wherein the determining of the first and second payload-state parameters comprises sensing a lateral acceleration of the vehicle.

15. The computer usable medium of claim 14 wherein the sensing of the lateral acceleration of the vehicle comprises sensing a longitudinal acceleration of the vehicle.

16. The computer usable medium of claim 13 wherein the determining of the first and second payload-state parameters comprises estimating at least one of a vehicle steering angle, a vehicle yaw rate, and a vehicle speed.

17. The computer usable medium of claim 13 wherein the first payload-state parameter comprises an unloaded vehicle condition.

18. The computer usable medium of claim 13 wherein the second payload-state parameter comprises a loaded vehicle condition.

19. The computer usable medium of claim 13 wherein the roll value comprises at least one parameter selected from a group consisting of a roll angle, a roll rate, a pitch angle, and a pitch rate.

20. The computer usable medium of claim 13 wherein the determining of the multiplier comprises determining at least one reliability factor.

21. The computer usable medium of claim 13 wherein the determining of the payload estimate comprises:

providing a predetermined value of the payload estimate; and updating the predetermined value of the payload estimate.

22. The computer usable medium of claim 13 further comprising computer readable program code for centering the roll value.

23. The computer usable medium of claim 13 further comprising computer readable program code for limiting the payload estimate to a value interval.

24. The computer usable medium of claim 13 further comprising computer readable program code for modulating a vehicle handling characteristic based on the payload estimate.

25. A system for determining a vehicle payload condition, the system comprising;

means for determining at least one roll value;

means for determining a first payload-state parameter and a second payload-state parameter;

means for determining a first differential based on the first payload-state parameter and the second payload-state parameter;

means for determining a second differential based on the first payload-state parameter and the roll value;

means for determining a multiplier;

means for determining a payload estimate based on the first payload differential, the second payload differential, and the multiplier.

26. The system of claim 25 further comprising means for modulating a vehicle handling characteristic based on the payload estimate.

* * * * *